United States Patent
Moriwaki et al.

[11] Patent Number: 5,989,660
[45] Date of Patent: *Nov. 23, 1999

[54] BASE FABRIC FOR AIR BAGS, A PROCESS FOR PRODUCING IT AND AN AIR BAG COMPRISING IT

[75] Inventors: Yoshitsugu Moriwaki; Tomomichi Fujiyama; Susumu Kano, all of Shiga-ken, Japan

[73] Assignee: Toray Industries, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,231

[22] Filed: Sep. 18, 1996

[30] Foreign Application Priority Data

Sep. 18, 1995 [JP] Japan .................................... 7-238532
Dec. 28, 1995 [JP] Japan .................................... 7-344132

[51] Int. Cl.$^6$ ............................. B60R 21/16; B65D 33/00
[52] U.S. Cl. ...................... 428/35.2; 428/36.1; 428/193; 428/196; 280/728.1; 280/743.1; 383/3; 383/117; 139/384 R; 442/183; 442/184
[58] Field of Search ................................... 428/35.2, 35.4, 428/35.5, 36.1, 102, 192, 193, 64.1, 66.6; 280/728.1, 743.1, 743.2; 442/183, 184; 383/3, 117; 139/384 R, 389, 387 R

[56] References Cited

U.S. PATENT DOCUMENTS

| | | | |
|---|---|---|---|
| 3,991,249 | 11/1976 | Yamashita et al. | 428/35.5 |
| 4,994,225 | 2/1991 | Davis | 264/257 |
| 5,110,666 | 5/1992 | Menzel et al. | 428/196 |
| 5,141,787 | 8/1992 | Yamamoto | 428/35.5 |
| 5,248,532 | 9/1993 | Sawada et al. | 428/35.2 |
| 5,258,211 | 11/1993 | Momii et al. | 428/35.2 |
| 5,336,538 | 8/1994 | Kitamura | 428/35.2 |
| 5,618,595 | 4/1997 | Matsushima et al. | 428/35.2 |

FOREIGN PATENT DOCUMENTS

| | | |
|---|---|---|
| 0 380 699 | 8/1990 | European Pat. Off. . |
| 30 43 288 | 6/1981 | Germany . |
| 2-114035 | 4/1990 | Japan . |
| 5-224910 | 2/1995 | Japan . |
| 2 265 122 | 9/1993 | United Kingdom . |
| WO 90-11914 | 10/1990 | WIPO . |

OTHER PUBLICATIONS

"Principles of Polymer Systems," Ferdinand Rodriguez, Hemisphere Publishing Corporation (1982) pp.:464–467.
Patent Abstracts of Japan, JP–A–07 040498, Feb. 10, 1995, Ikeda Bussan Co Ltd and Hamamatsu Kogyo KK, abstract only.
Database WPI, Section Ch, Week 9023, Derwent Publications Ltd., London, GB, Class A28 AN 90–174718XP002073113 & JP 02 114 035 abstract.
Database WPI, Section Ch, Week 9538, Derwent Publications Ltd., London, GB, Class A23 AN 95–289483 XP002073114 & JP 07 186 859 abstract.
Database WPI, Section Ch, Week 9236, Derwent Publications Ltd., London, GB, Class A92 AN 92–295182 XP00203115 & JP 04 201 649 abstract.

*Primary Examiner*—Rena L. Dye
*Attorney, Agent, or Firm*—Morrison & Foerster LLP

[57] ABSTRACT

A fabric for use as a base fabric in an air bag comprises a fibrous substrate having adhered to it a covering layer made of a thermoplastic synthetic resin and of 10 μm or less in average thickness. The adhesion between the fibrous substrate and covering layer is effected by causing the thermoplastic synthetic resin material of the covering layer to fill interstices between the fibers of the fibrous substrate. This may be achieved by applying to the fibrous substrate a solution or dispersion of the thermoplastic synthetic resin. An air bag may be constructed entirely from the fabric such that when it comprises sheet material additional to the base fabric, these may also be provided by the same fabric as that used for the base fabric.

25 Claims, 5 Drawing Sheets

BASE FABRIC FOR AIR BAGS, A PROCESS FOR PRODUCING IT AND AN AIR BAG COMPRISING IT

FIELD OF THE INVENTION

The present invention relates to an air bag which absorbs impact when a motor vehicle collides, thus affording passenger protection. In more detail, the invention relates to a fabric for use as a base fabric in an air bag, an air bag comprising the fabric, a method of producing it and its use as a base fabric in an air bag so as to provide an air bag having low air permeability and less susceptible to fraying.

BACKGROUND OF THE INVENTION

Conventional air bags are produced by coating or laminating a plain weave fabric, formed by weaving nylon 66 or nylon 6 filament yarns of 300 to 1000 deniers (330 to 1100 dtex), with an elastomer resin such as a synthetic rubber, for example chloroprene, chlorosulfonated olefin or silicone, to provide a base fabric with improved heat resistance, flame resistance, gas interceptability, etc., and cutting and sewing the base fabric into bags.

When the plain weave fabric is coated or laminated with such an elastomer resin, a coating process such as knife coating, roll coating or reverse coating, is generally adopted. If the plain weave fabric made from filaments is coated with a chloroprene elastomer resin, to make the base fabric, the resin is applied to the surface of the base fabric in an amount of 90 to 120 g/m$^2$, and the air bag produced is very heavy, hard and coarse in appearance. If the air bag is inflated to contact the face of the passenger, he/she can be scratched. Furthermore, also when it is folded into a compact standby style, it is hard to fold. If the base fabric is coated with silicone elastomer resin, the air bag is considerably more heat resistant and cold resistant than an air bag having a base fabric coated with chloroprene elastomer resin. Moreover, the amount of resin coated is only 40 to 60 g/m$^2$, thus allowing a reduction in weight and an improvement in appearance and foldability. However, as yet, such improvement is not regarded as sufficient. Furthermore, the coating or lamination with an elastomer resin requires a complicated process, with attendant problems in productivity.

In addition, it is also demanded that the base fabric for air bags be less expensive and more easily folded for reducing the size of the module cover. Thus, air bags using non-coated base fabrics have attracted attention. In particular, high density non-coated air bags formed from woven fabrics of polyamide fibers such as nylon 66 and nylon 6, and polyester fibers have been tested and found to have improved mechanical properties and foldability as compared with air bags formed from coated base fabrics. However, they become frayed during sewing and are not low enough in air permeability, i.e., not high enough in gas interceptability, and intensive studies are being made to solve these problems. For example, JP-A-64-070247 proposes a pressure-compressed base fabric. However, this does not sufficiently prevent fraying, even though it is lower in air permeability. Furthermore, JP-A-07-040798 and JP-A-0-503763 propose a base fabric formed from a urethane resin. In particular JP-A-07-040798 discloses an air bag having a base fabric coated by dipping into an emulsion of a urethane resin and subsequently treated with a fireproof agent. However, even though such air bags are highly improved from the point of view of prevention of fraying, they are not low enough in air permeability, especially since the air permeability is increased by thermal deterioration, so that maintenance of air permeability at a stable, low level cannot be assured.

SUMMARY OF THE INVENTION

The present invention seeks to overcome the above mentioned disadvantages of conventional air bags, so as to provide a base fabric for air bags which is prevented from being frayed during sewing, excellent in foldability and low in air permeability while retaining the mechanical properties required for air bags.

The present invention enables the above problems to be solved by providing, according to one aspect, a fabric for a base fabric for air bags, which fabric comprises a fibrous substrate and a covering layer, which covering layer is made of a thermoplastic synthetic resin and of 10 μm or less in average thickness and which covering layer is adhered to a surface of a fibrous substrate such that interstices between the fibers are filled with the resin, and also by providing, according to another aspect, an air bag comprising such a fabric. According to yet another aspect, the invention provides a process for producing a base fabric for air bags, comprising the steps of applying a solution or dispersion, in a liquid, preferably aqueous, medium, of a thermoplastic synthetic resin to a fibrous substrate; and heat-treating.

Basically, in accordance with the invention, a covering layer made of a thermoplastic synthetic resin is formed in such a way that the covering layer adheres to a fibrous substrate used in a fabric for air bags, and without this configuration, the present invention cannot be achieved. The process of the present invention can provide a fabric for air bags which does not fray during sewing, and from which air bags can be constructed which are excellent in foldability and low in air permeability while retaining the mechanical properties required for air bags.

The fibrous substrate of a fabric in accordance with the present invention can be a woven fabric, knitted fabric or non-woven fabric formed from polyamide fibers of nylon 6.6, nylon 6, nylon 12, nylon 4.6, nylon 6-nylon 6.6 copolymer, or any of copolymers of nylon with, for example, a polyalkylene glycol, dicarboxylic acid or amine, polyester fibers of a homopolyester such as polyethylene terephthalate or polybutylene terephthalate, or any copolymer thereof additionally containing units derived from another acid component of a polyester, such as an aliphatic dicarboxylic acid, for example, isophthalic acid, 5-sodiumsulfoisophthalic acid or adipic acid, aramid fibers of, for example, any copolymer formed from paraphenyleneterephthalamide and an aromatic ether, rayon fibers, sulfone based fibers, ultrahigh molecular weight polyethylene fibers, and high polymer fibers arranged within an islands-in-sea structure mainly composed of the above synthetic fibers. As the fabric of the fiber substrate, a woven fabric is preferable. As for the weave, a plain weave, twill weave, satin weave, modified weaves of these types or a multi-axial weave, can be used, but among them a plain weave, is preferable because it is excellent in mechanical properties and thin. Among these woven fabrics, a plain weave of polyamide fibers or polyester fibers is capable of providing an air bag having excellent properties. The fibers can contain various additives usually used for improving productivity and properties in the production and processing of raw filaments. For example, a thermal stabilizer, antioxidant, photo stabilizer, smoothing agent, antistatic agent, plasticizer, thickening agent, pigment or flame retarder, can be present The strength of the mono-filaments constituting the woven fabric is not especially limited, but is preferably 6 g/denier (6.7 g/dtex) or more, more preferably 7 g/denier (7.8 g/dtex) or more. The thickness of each of the mono-filaments and the thickness of each of the filament yarns respectively constituting the woven fabric are not especially limited as far as the mechanical properties required as air bags can be satisfied. However, it is preferable that the thickness of each of the mono-filaments is at least 0.1 denier (0.11 dtex), more preferably at least 0.5 denier (0.55 dtex) up to 7 deniers (7.8 dtex) inclusive, and that the thickness of each of the filament yarns is 200 to 500 deniers (220 to 550 dtex). Furthermore, the cover factor of the woven fabric is preferably 1700 to 2500 denier$^{0.5}$ in$^{-1}$[(0.9 dtex)$^{0.5}$(2.54 cm.)$^{-1}$]. The cover factor referred to here is expressed by ($\sqrt{D1}$)×N1+($\sqrt{D2}$)×N2, where D1 is the thickness (denier) (0.9 dtex) of each of the warp filament yarns, N1, the density of the warp filament yarns (number per inch) (number per 2.54 cm), D2, the thickness (denier) (0.9 dtex) of each of the weft filament yarns, and N2, the density of the weft filament yarns (number per inch) (number per 2.54 cm). The loom used for weaving is desirably a water jet loom, air jet loom or rapier loom.

The thermoplastic synthetic resin of the covering layer of a fabric in accordance with the present invention can be based on, for example, a polyurethane, polyester, polyamide, acrylic polymer, polyethylene or polypropylene. Among these thermoplastic synthetic resins, polyurethane based resins and polyester based resins are more effective. Having regard to environment resistance, particularly heat resistance of the base fabric for air bags, the softening point of the synthetic resin is preferably 120° C. or higher, more preferably 150° C. or higher. The softening point referred to here is the temperature at which the synthetic resin (solid) begins to flow at a pressure of 10 kg/cm$^2$. Among the synthetic resins, a resin formed from a self-dispersible resin is more effective. A self-dispersible resin refers to, for example, a colloid-dispersible resin with hydrophilic groups, for example, a metal sulfonate or carboxylate and dissolved or dispersed as fine grains in water, without requiring any emulsifier. For example, it can be an ionomer type urethane resin, for example, an anionic resin consisting of an aliphatic polyisocyanate and a polyol or an anionic resin consisting of an aromatic polyisocyanate and a polyol. More particularly, the ionomer type urethane resin may be, for example, a polyester based urethane resin, an ionomer type polyether based urethane resin or an ionomer type polycarbonate based urethane resin. Alternatively, the self-dispersible resin may be an ionomer type aliphatic polyester resin or ionomer type aromatic polyester resin composed of, for example, an anionic polyester. As required, the resin can also contain a crosslinking agent such as an epoxy compound, melamine or polyfunctional isocyanate, antioxidant such as an amine based compound or flame retarder such as a halogen compound. One, or a mixture of two or more of these resins can be used.

The average thickness of the film made of such a thermoplastic synthetic resin formed on the surface of a fibrous substrate is 10 μm or less, preferably 5 μm or less, more preferably 3 μm or less, especially 1–2 μm. If the thickness is more than 10 μm, the fibrous substrate becomes undesirably coarse and hard, being low in foldability. Furthermore, it is necessary that the film is formed to adhere to the fibrous substrate in a manner such that inter-fibrous meshes are filled with the resin. When the film is formed so as to adhere to the fibrous substrate like this, the film and the fibrous substrate are integrated to assure reinforced covering layer formation.

The thermoplastic synthetic resin is preferably deposited in an amount of 0.05 to 20%, more preferably 0.1 to 10% by weight based on the weight of the fibrous substrate alone. If the amount is too small, the effect of preventing fraying and the effect of lowering the air permeability are too small, and if more than necessary, the fibrous substrate becomes coarse and hard, to be undesirably low in foldability.

The thermoplastic synthetic resin may be applied as a solution or dispersion thereof in a liquid medium, preferably an aqueous medium. The resin solution or dispersion may exist initially in concentrated form, in which case it can be diluted at will to the desired resin solids concentration suitable for application. To apply the thermoplastic synthetic resin, immersion is usually adopted. In this case, for example, a dipping tank and a mangle or vacuum apparatus to ensure homogeneous impregnation may be used in combination. However, for example, a sprayer or foaming machine can also be used, and the resin application method is not especially limited. When a sprayer or foaming machine is used, the fabric can be coated with the resin on one side only or on both sides. The synthetic resin solution or dispersion, which can be applied directly as such (after dilution where appropriate) or as a liquid resin foam preferably contains 0.1 to 50 wt %, more preferably 0.5 to 20 wt %, of solid resin. The heat treatment is preferably applied at 50 to 200° C., more preferably 100 to 150° C. after completion of application of the synthetic resin coating. As required, the heat treatment can also be applied in two steps, for example at 80° C. at first, and then at 150° C. The impregnation of the fabric with the synthetic resin can be effected after looming, after scouring, after drying or after thermal setting, and physical processing such as pressure compression can also be applied additionally as required.

Having regard to air bag inflatability, the air permeability of the base fabric for air bags is preferably 20 cc/cm$^2$/sec or less, more preferably 10 cc/cm$^2$/sec or less, being the air flow rate through the base fabric measured when air is fed at a pressure of 0.2 kg/cm$^2$. The air bag produced using such a base fabric for air bags can be used as an air bag, for example, for a driver's seat, an air bag for a front passenger's seat, an air bag for a rear seat or an air bag for expansion from a position laterally of an occupant of a seat.

In the above air bag, in addition to the base fabric it is preferable to include, at least in one or more certain selected region(s), a reinforcing fabric layer or layers, superimposed on the base fabric, for example in regions surrounding apertures such as an inflator installing opening, vent holes, etc. and also to include in the bag construction at least one fabric piece which serves to control the configuration of the air bag when in an inflated condition. For ease of sewing, it is preferred that any such fabric layer or piece be of the same fabric as that of the base fabric of the air bag. Furthermore, for constructing the air bag, it is preferable that the or each fabric portion required for the air bag is obtained by punching or heat-cutting it out of a fabric in accordance with the invention, and then sewn at a peripheral region thereof to provide stitching, thereby securing the or each fabric portion in position, in a desired configuration in the air bag. More preferably, the stitching at the peripheral region for forming the air bag is achieved using only a single or double overlapped seam.

Advantageous features of a fabric embodying the invention when used at least as a base fabric in an air bag, also embodying the present invention, are freedom from fraying during sewing, excellent foldability, and the possibility of keeping the air permeability low in a range preferable for air bags, while retaining the mechanical properties required for air bags.

Thus, according to an especially preferred aspect, the invention provides an air bag comprising a base fabric, which fabric comprises a covering layer made of a thermoplastic synthetic resin and of 10 μm or less in average thickness, which covering layer is adhered to the surface of a fibrous substrate such that interstices between the fibers are filled with the resin.

BRIEF DESCRIPTION OF THE DRAWINGS

Embodiments of the present invention will now be described in more detail with reference to the accompanying drawings and the following Examples.

In the drawings.

DETAILED DESCRIPTION OF THE INVENTION

Figure 1:
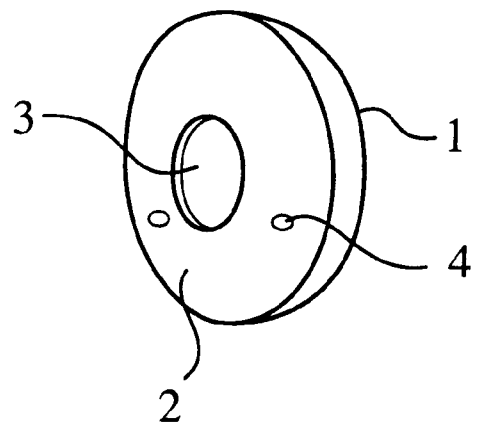
FIG. 1 is a perspective view showing an air bag embodying the invention for a driver's seat.

Thus, referring to FIG. 1, an air bag for a driver's seat has a base fabric portion 1 which, when fitted in front of the driver's seat, faces the driver, a fabric portion 2 for contact with an inflator, a circular opening 3 for connection to the inflator and vent holes 4.

Figure 2:
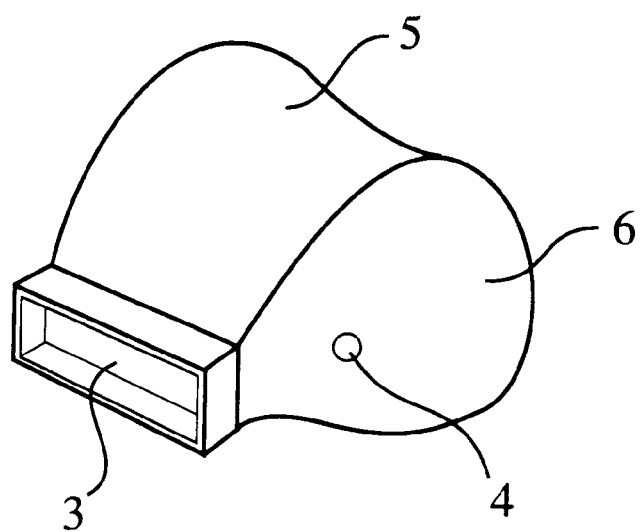
FIG. 2 is a perspective view showing an air bag embodying the invention for a front passenger's seat.
Figure 3:
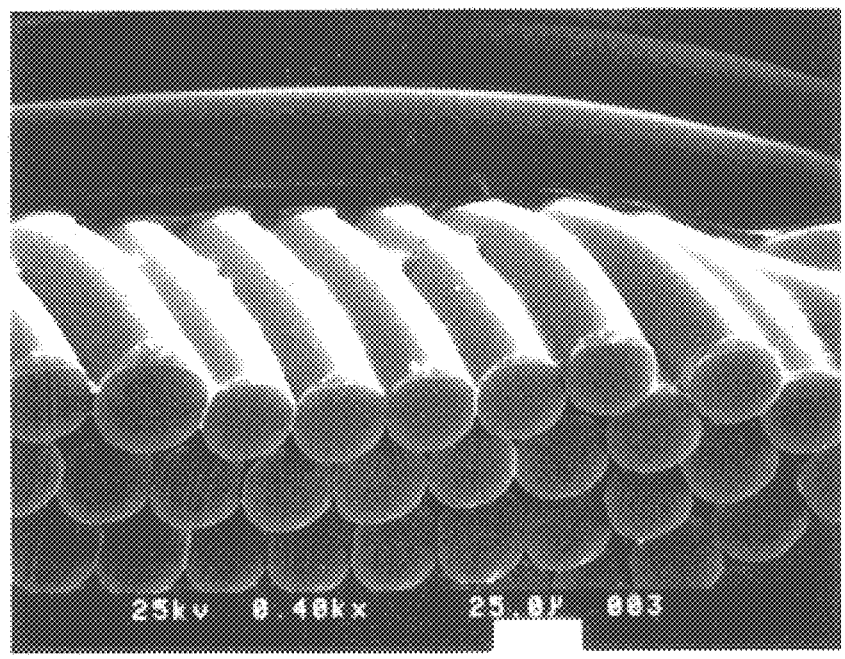
FIGS. 3–5 are respective photomicrographs of fabrics prepared in accordance with Examples 1–3.
Figure 4:
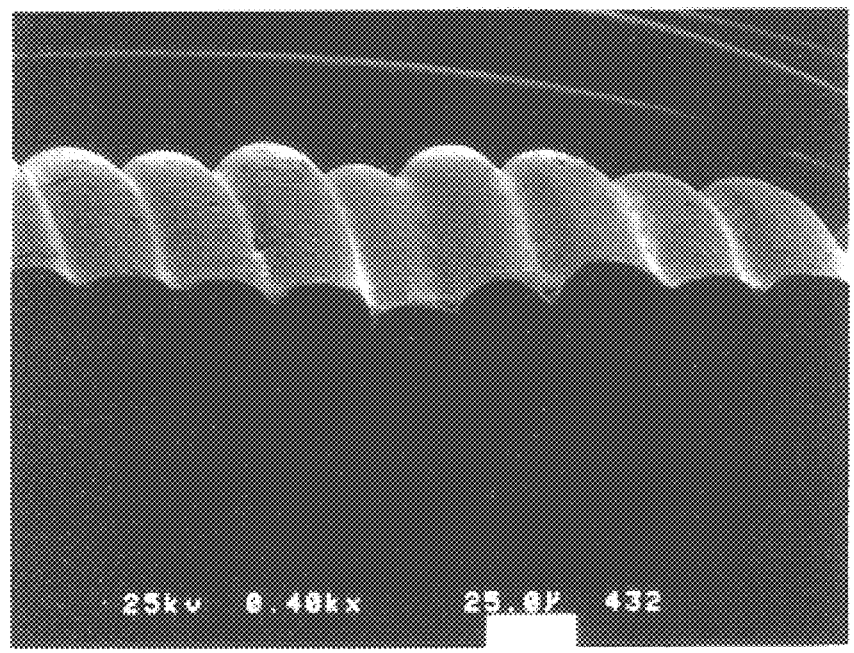
Figure 5:
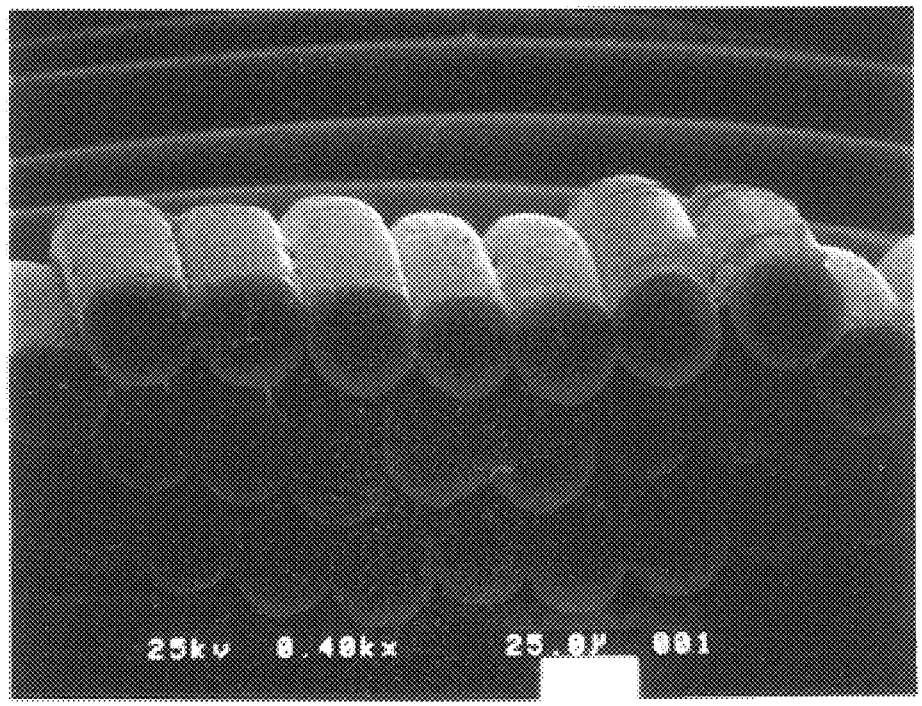

Referring to FIG. 2, an air bag for a passenger's seat has a base fabric portion 5 which, when fitted in front of the passenger's seat, faces the passenger, a pair of fabric portions 6 providing respective laterally disposed fabric pieces for controlling the configuration of the bag when in an inflated condition, a rectangular opening 3 for connection to an inflator and vent holes 4.

The respective properties referred to in the Examples below were evaluated according to the following methods:

Tensile strength: The average of the values of warp and weft directions was obtained according to JIS L 1096 (6.12.1A) method.

Breaking elongation: The average of the values of warp and weft directions was obtained according to JIS L 1096 (6.12.1A) method.

Bursting strength: The average of the values of warp and weft directions was obtained according to JIS L 1096 (6.12.1A) method.

Thickness of covering layer: A photomicrograph of a cross section of the coated fabric was taken and a covering layer portion of a certain length was cut out of it. Then, the average thickness of the covering layer was obtained from the following formula:

(Area of covering layer portion)×(Thickness of certain length portion)/(Area of certain length portion).

Weight ratio of resin:fabric: This can be determined by multiplication of the cut out area referred to above by the density of the resin. Alternatively, the weight ratio of resin:fabric can be determined merely by measuring the difference between the respective weights of coated and uncoated fabrics. However, this method may sometimes be less accurate because the weight ratio may be very small and the fibrous substrate may not be sufficiently dimensionally stable for an accurate measurement.

Air permeability: A laminar flow type air permeability measuring instrument was used, and air was fed at a pressure of 0.2 $kg/cm^2$, to measure the flow rate of the air passing through the sample ($cc/cm^2/sec$).

Environment resistance: The base fabric was treated at 110° C. for 500 hours, then at 80° C. and 95% for 500 hours, and finally at −40° C. for 24 hours respectively in a thermo-hygrostat, and then the air permeability was measured.

Prevention of fraying: The woven fabric was cut into a disc 20 cm in diameter, and placed in a drum type rotating machine, being rotated at 25° C. for 15 minutes. The degree of fraying was expressed in terms of the following grades.

Grade 5: No fraying

Grade 3: Fraying observed

Grade 1: Fraying remarkable (Grade 2 and Grade 4 express the respectively intermediate conditions of fraying.)

Foldability: A 60-liter air bag was folded into a predetermined form, and with a pressure of 98N applied, its folded height was measured. It was expressed as a relative value with reference to the folded height of a standard silicone rubber coated air bag (coated by 45 $g/m^2$) as 100.

EXAMPLES 1 and 2

Nylon 6.6 filament yarns each of 420 deniers 467 dtex and each filament yarn consisting of 72 filaments, 9.5 g/denier (10.6 g/dtex) in strength and 24.1% in elongation were used to obtain a plain weave of 53 yarns/inch (20.9 yarns/cm) in both the warp and weft yarn densities, using a water jet loom. The woven fabric-was scoured at 60° C. and dried at 130° C. respectively according to conventional methods. Then, the woven fabric was immersed in a diluted resin solution containing 10 wt %, as solid content, of an anionic ionomer type polyester based urethane resin consisting of an aliphatic polyisocyanate and a polyol and of 150° C. in softening point [Example 1] or a water dispersed polyester based urethane resin with the same composition emulsified by a polyethylene glycol aliphatic ester based emulsifier [Example 2], and pressed and rendered smooth by a mangle at 3 $kg/cm^2$. In this case, the softening point was measured as follows. The solid resin to be measured was placed in a tube of 1 mm in inner diameter, and heated at a pressure of 10 $kg/cm^2$, and the temperature at which the resin began to flow was measured and identified as the softening point. The coated woven fabric was then dried at 120° C. for 3 minutes and thermally set at 160° C. for 25 seconds, to obtain a base fabric for air bags. Subsequently, from the base fabric for air bags, two base fabric discs of 725 mm in diameter were punched out. At the center of one of the discs, three circular reinforcing fabric sheets of 200 mm in diameter of the same fabric were laminated, and circular lines of 110 mm, 145 mm and 175 mm in diameter were respectively sewn by a lock stitch sewing machine using sewing threads of nylon 6.6 fiber 420D/1×3 as needle and bobbin threads. At the center, a hole of 90 mm in diameter was formed as the inflator installing opening. Furthermore, each one circular reinforcing fabric sheet of 75 mm in diameter of the same fabric was placed at two opposite positions 255 mm from the center in the bias direction, and circles of 50 mm and 60 mm were sewn by a lock stitch sewing machine using sewing threads of nylon 6.6 fiber 420D/1×3 as needle and bobbin threads. At the two positions, holes of 40 mm in diameter were formed as vent holes. Then, on the fabric disc with the reinforcing fabric sheets kept outside, the other fabric disc was overlapped with its warp axis shifted by 45 degrees, and circles of 700 mm and 710 mm in diameter were sewn by a multi-thread chain stitch sewing machine using sewing threads of nylon 6.6 fiber 1260D/1 as needle and looper threads. The bag was reversed, to complete an air bag for the driver's seat of 60 liters in capacity.

The properties of the base fabric for air bags thus obtained are shown in Table 1. The base fabric for air bags of the present invention retained the mechanical properties required for air bags, were free from fraying during sewing, and were excellent in low air permeability and foldability as an air bag.

Comparative Example 1

The same woven fabric as that used in Example 1 was scoured at 60° C., dried at 130° C. and thermally set at 160° C. for 25 seconds, to obtain a base fabric for air bags. Then, as described for Example 1, an air bag for the driver's seat of 60 liters in capacity was manufactured.

The properties of the base fabric for air bags thus obtained are shown in Table 1. The base fabric for air bags of Comparative Example 1 was excellent in foldability as an air bag, but rather insufficient in low air permeability, and furthermore, when sewn, it was frayed so as also to pose a problem in productivity.

EXAMPLE 3

Nylon 6.6 filament yarns each of 315 deniers (35 dtex) and each filament yarn consisting of 72 filaments, 9.4 g/denier (10.4 g/dtex) in strength and 23.3% in elongation were used to obtain a plain weave of 60 yarns/inch (23.6 yarns/cm) in both the warp and weft yarn densities, using a water jet loom. Then, the woven fabric was foam-coated, on one side, with a foam diluted solution containing 30 wt %, as solid content, of the same ionomer type polyester based urethane resin as used in Example 1 and 0.1 wt %, as solid content, of a nonionic foaming agent, and of 7 times in expansion ratio. It was dried at 130° C. for 2 hours, and thermally set at 160° C. for 25 seconds, to obtain a base fabric for air bags. From the base fabric for air bags, one main body fabric sheet and two lateral fabric sheets were fusion-cut, and an air bag for the front passenger's seat of 120 liters in capacity as shown in FIG. 2 was manufactured.

The properties of the base fabric for air bags thus obtained were similarly evaluated and found to be as shown in Table 1. The base fabric for air bags of the present invention held the mechanical properties required for air bags, and was free from fraying during sewing, and excellent in low air permeability and foldability as an air bag.

Comparative Example 2

The same woven fabric as used in Example 1 was thermally set at 160° C. for 25 seconds, to obtain a base fabric for air bags. Then, an air bag for the front passenger's seat of 120 liters in capacity was manufactured, as described for Example 2.

The properties of the base fabric for air bags thus obtained were similarly evaluated and found to be as shown in Table 1. The base fabric for air bags of Comparative Example 2 was excellent in foldability as an air bag, but was rather insufficient in low air permeability, and when sewn, it was frayed so as also to pose a problem in productivity.

EXAMPLE 4

Polyethylene terephthalate filament yarns each of 420 deniers (467 dtex) and each filament yarn consisting of 144 filaments, 9.0 g/denier (10 g/dtex) in strength and 18.2% in elongation were used to obtain a plain weave of 57 yarns/inch (22.4 yarns/cm) in the warp yarn density and 53 yarns/inch (20.9 yarns/cm) in the weft yarn density, using an air jet loom. Then, the woven fabric was scoured at 80° C., dried at 130° C., thermally set at 180° C. for 25 seconds, immersed in a diluted resin solution containing 12.5 wt %, as solid content, of an anionic ionomer type aliphatic polyester resin of 155° C. in softening point, pressed and rendered smooth by a mangle at 4 kg/cm$^2$, dried at 150° C. for 2 minutes, and thermally set at 180° C. for 25 seconds, to obtain a base fabric for air bags. From the base fabric, an air bag for the driver's seat of 60 liters in capacity was manufactured as described for Example 1.

The properties of the base fabric for air bags thus obtained are shown in Table 1. The base fabric for air bags of the present invention were free from fraying during sewing, and excellent in low air permeability and foldability as an air bag.

Comparative Example 3

The same woven fabric as used in Example 4 was scoured at 80° C., dried at 130° C., and thermally set at 180° C. for 25 seconds, to obtain a base fabric for air bags. From the base fabric, an air bag for the driver's seat of 60 liters in capacity was manufactured as described for Example 1.

The properties of the base fabric for air bags thus obtained were similarly evaluated and found to be as shown in Table 3. The base fabric for air bags of Comparative Example 3 was excellent in foldability as an air bag, but was rather insufficient in low air permeability, and when sewn, it was frayed remarkably, so as to pose a problem in productivity.

Comparative Example 4

The same woven fabric as used in Example 1 was scoured at 80° C., dried at 130° C. and thermally set at 180° C. for 25 seconds. Then, it was pressurized and compressed on one side, between a metallic roll, having a smooth surface, heated to 160° C. and a plastic roll at room temperature at a pressure of 25 tons at a speed of 15 m/min, to produce a base fabric for air bags. Then, as described for Example 1, an air bag for the driver's seat of 60 liters in capacity was manufactured.

The properties of the base fabric for air bags thus obtained are shown in Table 1. The base fabric for air bags of Comparative Example 4 was rather improved but insufficient in low air permeability.

Comparative Example 5

Nylon 6.6 filament yarns of 840 deniers (933 dtex) and each filament yarn consisting of 136 filaments, 9.4 g/denier (10.4 g/dtex) in strength and 23.8% in elongation were used to obtain a plain weave of 25 yarns/inch (9.8 yarns/cm) in both the warp and weft yarn densities, using a water jet loom. The woven fabric was scoured at 60° C., dried at 130° C. and thermally set at 180° C. for 25 seconds. Then, the woven fabric was coated with 95 g/m$^2$ of chloroprene rubber by twice coating, using a type of knife coater, dried at 130°

C., and vulcanized at 180° C. for 3 minutes, to obtain a base fabric for air bags. Subsequently, as described for Example 1, an air bag for the driver's seat of 60 liters in capacity was manufactured.

The properties of the base fabric for air bags thus obtained were evaluated as described for Example 1 and found to be as shown in Table 1. The base fabric for air bags of Comparative Example 5 was excellent in the prevention of fraying and low air permeability, but was so hard as to impair foldability and to complicate processing disadvantageously having regard to productivity.

Comparative Example 6

The same nylon 6.6 filament yarns as used in Example 1 were used, to weave a plain weave of 46 yarns/inch (18.1 yarns/cm) in both the warp and weft yarn densities, using a water jet loom. The woven fabric was scoured at 60° C., dried at 130° C. and thermally set at 180° C. for 25 hours. Then, the woven fabric was coated with 45 g/m² of a methylvinyl based silicone rubber, using a type of knife coater, dried at 130° C., and vulcanized at 180° C. for 3 minutes, to obtain a base fabric for air bags. Subsequently, as described for Example 1, an air bag for the driver's seat of 60 liters in capacity was manufactured.

The properties of the base fabric for air bags thus obtained were evaluated as described for Example 1 and found to be as shown in Table 1. A photomicrograph of the base fabric for air bags of Comparative Example 6 is shown in FIG. 9.

Figure 9A:
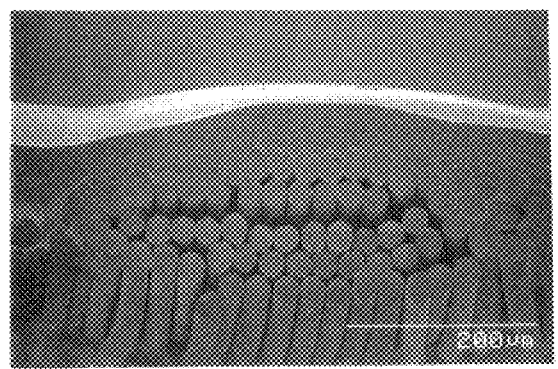
FIG. 9 is a photomicrograph of a coated fabric produced in accordance with Comparative Example 6.
Figure 9B:
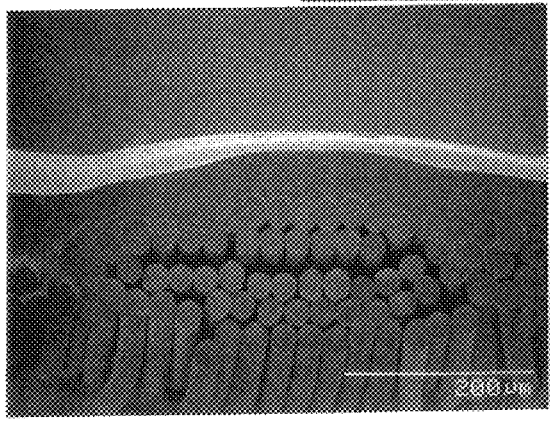
Figure 9C:
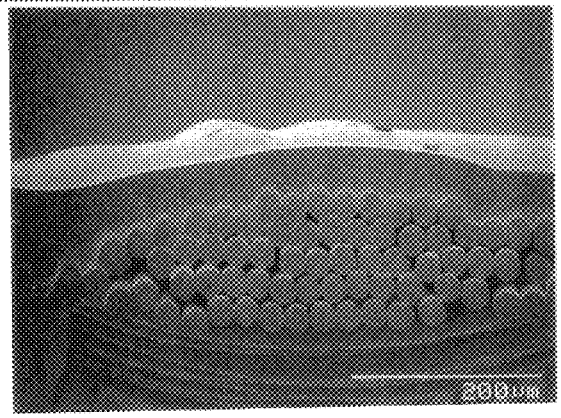

As can be seen by comparison with FIGS. 3–7, the covering layer of the base fabric of FIG. 9 is particularly thick. As is evident from Table 1, the base fabric of Comparative Example 6 was excellent in the prevention of fraying during sewing, and low air permeability, but was so hard as to impair foldability and also to complicate processing disadvantageously having regard to productivity.

EXAMPLE 5

Figure 6:
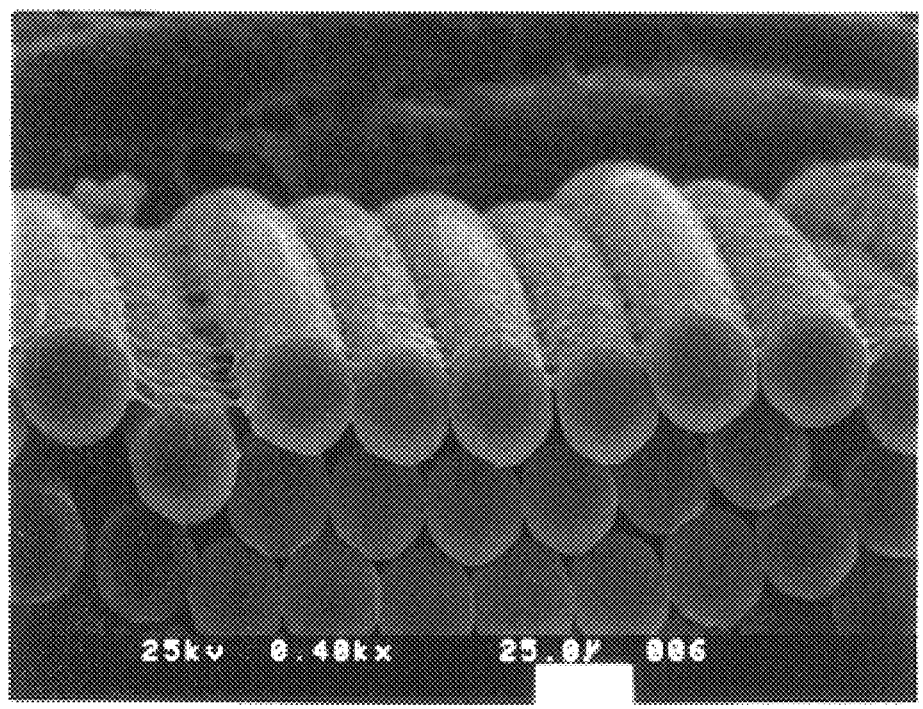
FIG. 6 is a photomicrograph of a fabric embodying the invention with an ionomer type polyurethane covering layer provided by coating.

Nylon 6.6 filament yarns each having a denier of 420 (467 dtex) and each filament yarn consisting of 72 filaments, having a strength of 9.5 g/denier and an elongation of 24.1% were used to obtain a plain weave having both warp and weft yarn densities of 53 yarns/inch (21 yarns/cm) using a water jet loom. The woven fabric was then knife-coated with a paste-like foam prepared by adding a thickening agent to a solution of an anionic ionomer type polyester based urethane resin having a softening point of 150° C. and dried at 130° C. for three minutes. A photomicrograph of the resulting base fabric is shown in FIG. 6.

EXAMPLE 6

Figure 7:
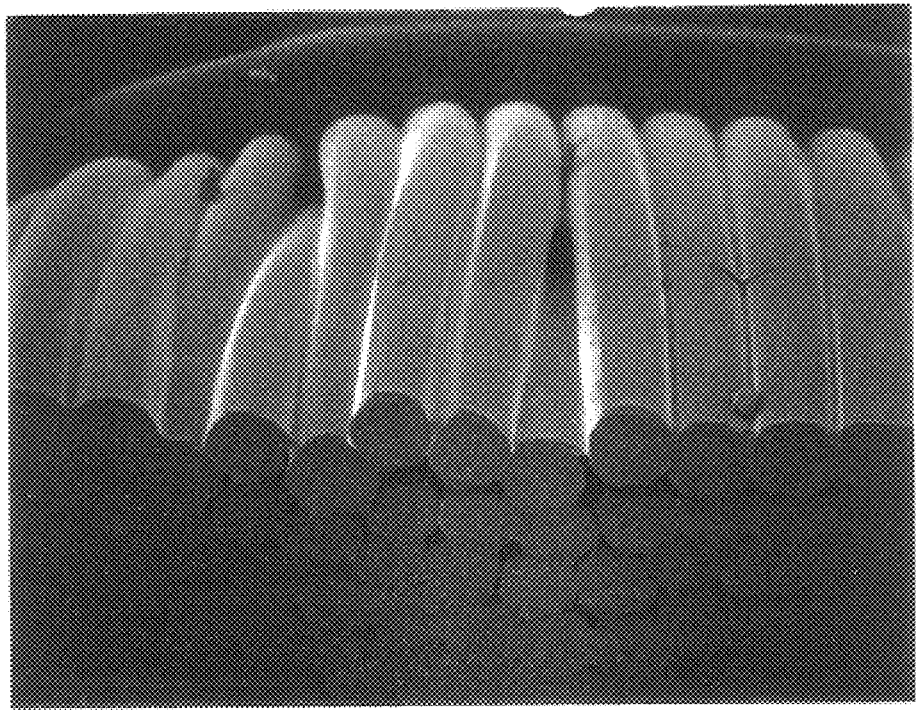
FIG. 7 is a photomicrograph of a fabric with an ionomer type polyurethane covering layer provided by immersion.
Figure 8:
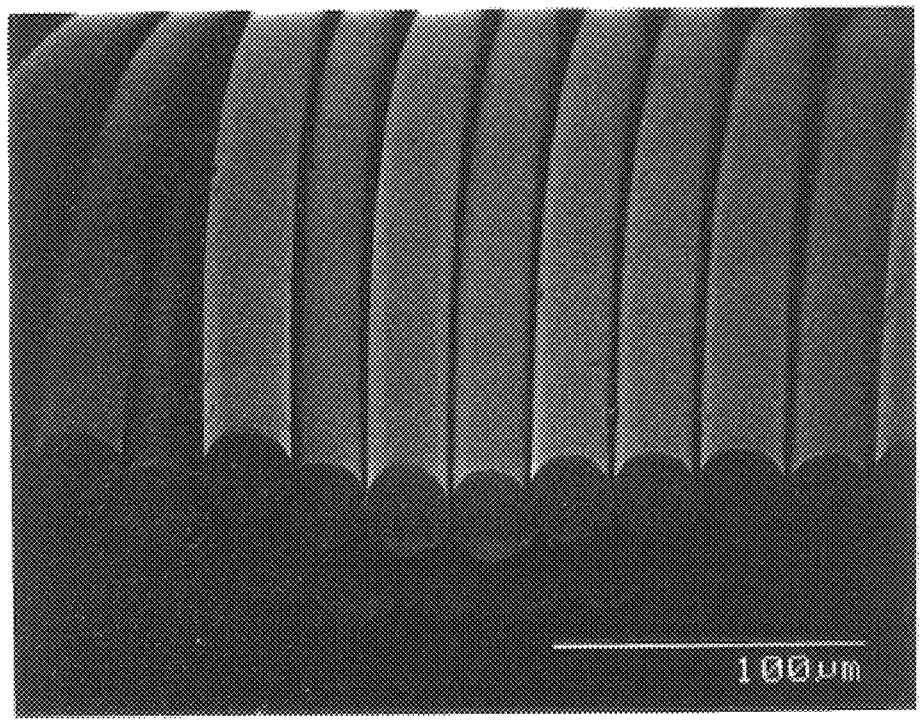
FIG. 8 is a photomicrograph of an uncoated fibrous substrate prior to application thereto of a covering layer.

Nylon 6.6 filament yarns each having a denier of 420 (467 dtex) and each filament yarn consisting of 72 filaments, having a strength of 9.5 g/denier and an elongation of 24.1% were used to obtain a plain weave having both warp and weft yarn densities of 55 yarns/inch (22 yarns/cm), using a water jet loom. The woven fabric was scoured at 80° C., dried at 130° C. and heat set at 180° C. A photomicrograph of this untreated fabric is shown in FIG. 8. The woven fabric was then immersed in a diluted resin solution containing 10 wt %, as solid content, of an anionic ionomer type polyester based urethane resin having a softening point of 120° C. and squeezed with a mangle under a pressure of 3 kg/cm². The fabric was dried at 120° C. for three minutes and heat set at 160° C. for 25 seconds. A photomicrograph of the resulting base fabric is shown in FIG. 7.

TABLE 1

| | Item | Example 1 | Example 2 |
|---|---|---|---|
| Components | Material | N66 | N66 |
| | Thickness of each filament yarn (D) (d) (0.9 dtex) | 420 | 420 |
| | Thickness of each monofilament (d) (d) (0.9 dtex) | 5.8 | 5.8 |
| | Number of filaments of each filament yarn | 72 | 72 |
| | Strength (g/d) (g/0.9 dtex) | 9.5 | 9.5 |
| | Elongation (%) | 24.1 | 24.1 |
| | Cover factor | 2,172 | 2,172 |
| | Loom | WJL | WJL |
| Processing conditions | Resin | Polyurethane (aqueous) | Polyurethane (water dispersed) |
| | Softening point (° C.) | 152 | 156 |
| | Concentration of diluted solution (wt %) | 10 | 10 |
| | Covering layer application method | Immersion | Immersion |
| Properties of processed base fabric | Deposited amount (wt %) | 1.2 | 1.3 |
| | Average covering layer thickness (μm) | 1.1 | 1.2 |
| | Tensile strength (N/cs) | 727 | 726 |
| | Breaking elongation (%) | 30 | 31 |
| | Bursting strength (N) | More than 450 | More than 450 |
| | Air permeability (cc/cm²/sec) Initial | 6.5 | 6.7 |
| | Heat resistance | 6.7 | 10.3 |
| | Cold resistance | 6.1 | 6.6 |
| | Moisture resistance | 6.3 | 6.5 |
| | Prevention of fraying (grade) | 4–5 | 4–5 |
| | Foldability | 87 | 87 |
| | Productivity | Excellent | Excellent |

| | Item | Comparative example 1 | Example 3 | Comparative example 2 |
|---|---|---|---|---|
| Components | Material | N66 | N66 | N66 |
| | Thickness of each filament yarn (D) (d) (0.9 dtex) | 420 | 315 | 315 |
| | Thickness of each monofilament (d) (d) (0.9 dtex) | 5.8 | 4.4 | 4.4 |
| | Number of filaments of each filament yarn | 72 | 72 | 72 |
| | Strength (g/d) (g/0.9 dtex) | 9.5 | 9.4 | 9.4 |
| | Elongation (%) | 24.1 | 23.3 | 23.3 |
| | Cover factor | 2,172 | 2,129 | 2,129 |
| | Loom | WJL | WJL | WJL |
| Processing conditions | Resin | — | Polyurethane (aqueous) | — |
| | Softening point (° C.) | — | 145 | — |
| | Concentration of diluted solution (wt %) | — | 30 | — |
| | Covering layer application method | — | Foam coating | — |
| Properties of processed base fabric | Deposited amount (wt %) | — | 1.6 | — |
| | Average covering layer thickness (μm) | — | 2.8 | — |
| | Tensile strength (N/cs) | 722 | 678 | 680 |
| | Breaking elongation (%) | 28 | 29 | 30 |
| | Bursting strength (N) | More than 450 | More than 450 | More than 450 |

TABLE 1-continued

|  |  | | | |
|---|---|---|---|---|
| Air permeability (cc/cm²/sec) | Initial | 25.3 | 6.1 | 24.8 |
|  | Heat resistance | 32.1 | 6.3 | 31.9 |
|  | Cold resistance | 22.4 | 5.8 | 22 |
|  | Moisture resistance | 23.8 | 5.9 | 23.2 |
| Prevention of fraying (grade) | | 1–2 | 4–5 | 1–2 |
| Foldability | | 85 | 79 | 77 |
| Productivity | | More excellent | Excellent | More excellent |

| | Item | Example 4 | Comparative example 3 | Comparative example 4 | Comparative example 5 |
|---|---|---|---|---|---|
| Components | Material | PET | PET | PET | N66 |
| | Thickness of each filament yarn (D)(d) (0.9 dtex) | 420 | 420 | 420 | 840 |
| | Thickness of each monofilament (d)(d)(0.9 dtex) | 2.9 | 2.9 | 2.9 | 6.2 |
| | Number of filaments of each filament yarn | 144 | 144 | 144 | 136 |
| | Strength (g/d)(g/0.9 dtex) | 9 | 9 | 9 | 9.4 |
| | Elongation (%) | 18.2 | 18.2 | 18.2 | 23.8 |
| | Cover factor | 2,254 | 2,254 | 2,254 | 1,449 |
| | Loom | AJL | AJL | AJL | WJL |
| Processing conditions | Resin | Polyester (aqueous) | — | — | Chloroprene rubber |
| | Softening point (° C.) | 147 | — | — | — |
| | Concentration of diluted solution (wt %) | 15 | — | — | — |
| | Covering layer application method | Immersion | — | Calender | Rubber coating |
| Properties of processed base fabric | Deposited amount (wt %) | 1.8 | — | — | 90 |
| | Average covering layer thickness (μm) | 1.6 | — | — | 85 |
| | Tensile strength (N/cs) | 698 | 695 | 685 | 744 |
| | Breaking elongation (%) | 25 | 24 | 23 | 30 |
| | Bursting strength (N) | More than 450 | More than 450 | More than 450 | More than 450 |
| | Air permeability (cc/cm²/sec) Initial | 7.1 | 22.5 | 13.1 | 0 |
| | Heat resistance | 7.3 | 24.7 | 16.9 | 0 |
| | Cold resistance | 7 | 21.6 | 13.2 | 0 |
| | Moisture resistance | 7 | 21.9 | 13.5 | 0 |
| | Prevention of fraying (grade) | 4–5 | 1–2 | 2 | 5 |
| | Foldability | 84 | 82 | 86 | 168 |
| | Productivity | Excellent | More excellent | Excellent | Poor |

As can be seen from the above Examples and Comparative Examples, the present invention enables air bag to be provided which still have the required mechanical properties, while at the same time minimising the incidence of fraying during sewing and exhibiting excellent foldability and low air permeability, all at an expense lower than that of conventional coated air bags and calendered air bags.

We claim:

1. An air bag comprising an air bag fabric comprising a fabric material comprising a fibrous substrate and a covering layer made of a thermoplastic synthetic resin of less than 5 μm in average thickness, said covering layer being adhered to a surface of the fibrous substrate such that interstices between the fibers are bridged by the thermoplastic synthetic resin covering layer and the thermoplastic synthetic resin is present in an amount of 0.05 to 20% based on the weight of the fibrous substrate.

2. An air bag according to claim 1, comprising sheet material selected from (a) sheet material providing at least one reinforcing layer superimposed on the base fabric at least in at least one selected region thereof, and (b) sheet material providing at least one fabric piece for controlling the configuration of the air bag when in an inflated condition, said fabric material additionally providing said sheet material.

3. An air bag according to claim 2, wherein said sheet material provides a plurality of said reinforcing layers superimposed on the base fabric in regions thereof containing respective apertures provided in the air bag.

4. An air bag according to claim 2, wherein said sheet material provides at least two fabric pieces for controlling the configuration of the air bag when in an inflated condition.

5. An air bag according to claim 2, wherein said sheet material has stitches sewn at a peripheral region thereof to secure said sheet material in position, in a desired configuration, in the air bag.

6. An air bag according to claim 5, wherein the stitching at the peripheral region provides an overlapped seam selected from only single and double overlapped seams.

7. An air bag according to claim 1, wherein the average thickness of the covering layer is no more than 5 μm.

8. A fabric according to claim 7, wherein the average thickness of the covering layer is no more than 3 μm.

9. An air bag according to claim 1, wherein the air bag fabric has an air permeability which is at most half of that of the fibrous substrate.

10. A fabric according to claim 1, wherein the thermoplastic synthetic resin has a softening point of at least 120° C.

11. A fabric according to claim 10, wherein the thermoplastic synthetic resin has a softening point of at least 150° C.

12. An air bag according to claim 1, wherein the thermoplastic synthetic resin is self-dispersible when in an aqueous medium.

13. An air bag according to claim 12, wherein the self-dispersible resin is an ionomer synthetic resin.

14. An air bag according to claim 1, wherein the thermoplastic synthetic resin is a resin selected from the group consisting of urethane and polyester resins.

15. An air bag according to claim 14, wherein the thermoplastic synthetic resin is at least one urethane resin selected from the group consisting of polyester based urethane resins, polyester based urethane resins and polycarbonate based urethane resins.

16. An air bag according to claim 1, wherein the thermoplastic synthetic resin is present in an amount of 0.1 to 10% based on the weight of the fibrous substrate.

17. An air bag according to claim 1, wherein the fibrous substrate is a woven fabric.

18. An air bag according to claim 17, wherein the woven fabric has a total cover factor (CF) of 1700 to 2500.

19. An air bag according to claim 17, wherein the thickness of each of the filament yarns constituting the woven fabric is 200 to 500 deniers.

20. An air bag according to claim 17, wherein woven fabric comprises mono-filaments having a thickness of 0.5 to 7 deniers.

21. An air bag according to claim 17, wherein the woven fabric is a 1×1 plain weave fabric.

22. An air bag according to claim 1, wherein fibers constituting the fibrous substrate are at least one kind of fiber selected from the group consisting of polyamide based fibers and polyester based fibers.

23. An air bag according to claim 1, the base fabric having an air permeability of no more than 20 $cc/cm^2/sec$, being the air flow rate through the base fabric measured when air is fed at a pressure of 0.2 $kg/cm^2$.

24. An air bag according to claim 23, wherein the air permeability is no more than 10 $cc/cm^2/sec$.

25. An air bag comprising a plurality of fabric portions each comprising a fabric material, the fabric material of each said portion comprising a fibrous substrate and a covering layer made of a thermoplastic synthetic resin and being less than 5 μm in average thickness, said covering layer being adhered to a surface of the fibrous substrate such that interstices between the fibers are bridged by the thermoplastic synthetic resin covering layer, at least one of said fabric portions providing a base fabric of the air bag and each of said fabric portions having stitches sewn at an external peripheral region thereof to secure the respective fabric portions in position in a desired configuration in the air bag and the thermoplastic synthetic resin is present in an amount of 0.05 to 20% based on the weight of the fibrous substrate.

* * * * *

UNITED STATES PATENT AND TRADEMARK OFFICE

CERTIFICATE OF CORRECTION

PATENT NO. : 5,989,660

DATED : November 23, 1999

INVENTOR(S) : Yoshitsugu MORIWAKI *et al.*

It is certified that error appears in the above-identified patent and that said Letters Patent is hereby corrected as shown below:

Claims 2, 3, 23 and 25, change "base" to --air bag-- at each occurrence.

Claims 8, 10 and 11, line 1 of each, change "A fabric" to --An air bag--.

Claims 2, line 1, change "comprising" to --further comprising a-- line 2, insert --a-- before "sheet", and line 4, insert --a-- before "sheet".

Signed and Sealed this

Tenth Day of April, 2001

*Attest:*

NICHOLAS P. GODICI

*Attesting Officer*    *Acting Director of the United States Patent and Trademark Office*